United States Patent
Pi

(10) Patent No.: US 8,391,130 B2
(45) Date of Patent: Mar. 5, 2013

(54) METHOD AND APPARATUS FOR ESTIMATING AND REDUCING INTERFERENCE IN WIRELESS COMMUNICATION SYSTEMS

(75) Inventor: Zhouyue Pi, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1663 days.

(21) Appl. No.: 11/756,035

(22) Filed: May 31, 2007

(65) Prior Publication Data
US 2008/0125048 A1   May 29, 2008

Related U.S. Application Data

(60) Provisional application No. 60/867,436, filed on Nov. 28, 2006.

(51) Int. Cl.
  *H04J 11/00* (2006.01)
  *H04L 5/04* (2006.01)
  *H04B 7/10* (2006.01)
(52) U.S. Cl. ......... 370/208; 370/329; 375/347; 455/450
(58) Field of Classification Search ............ 370/328, 370/338, 394, 445, 203, 204, 206–210, 281, 370/295, 302, 310, 329, 336, 341–347, 436, 370/441–442, 478, 480–482; 455/63.1, 17, 455/45, 59, 101, 104, 450–453; 375/346–350, 375/135, 146, 148, 222, 260, 295, 299, 358, 375/377, E1.01; 714/748–750
See application file for complete search history.

(56) References Cited

U.S. PATENT DOCUMENTS

| | | | | |
|---|---|---|---|---|
| 7,170,849 | B1 * | 1/2007 | Arivoli et al. | 370/208 |
| 7,778,337 | B2 * | 8/2010 | Tong et al. | 375/260 |
| 2002/0080867 | A1 * | 6/2002 | Abbas et al. | 375/222 |
| 2004/0086027 | A1 * | 5/2004 | Shattil | 375/146 |
| 2007/0097927 | A1 * | 5/2007 | Gorokhov et al. | 370/335 |
| 2007/0211667 | A1 * | 9/2007 | Agrawal et al. | 370/335 |
| 2007/0286226 | A1 * | 12/2007 | Yoon et al. | 370/445 |
| 2008/0062857 | A1 * | 3/2008 | Monogioudis et al. | 370/208 |
| 2008/0101441 | A1 * | 5/2008 | Palanki et al. | 375/146 |
| 2008/0108310 | A1 * | 5/2008 | Tong et al. | 455/69 |
| 2009/0052381 | A1 * | 2/2009 | Gorokhov et al. | 370/329 |
| 2010/0002640 | A1 * | 1/2010 | Gorokhov et al. | 370/329 |

OTHER PUBLICATIONS

Extended European Search Report dated Jan. 10, 2013 in connection with European Patent Application No. 07851153.2, 7 pages.
Wang, et al.; "R-ACK for Multiplexing of Resource Channel"; XP-002689312 3GPP2-C30-20060911-065r2; Huawei ZTE; Sep. 11, 2006; 10 pages.
Kwon, et al.; "R-ACKCH to Support FL Multi-Layer Transmission"; XP-002689313 3GPP2-C30-20060911-058; Samsung Electronics Co., Sep. 12, 2006; 5 pages.
Kwon, et al.; "Rule R-ACKCH design for FL MCW or SDMA support"; XP-002689314 3GPP2 C30-20061030-043; Samsung Electronics Co., Oct. 30, 2006, 11 pages. Kwon, et al.; "R-ACKCH for RL SDMA support"; XP-002689315 3GPP2 C30-20060911-059; Samsung Electronics Co., Sep. 11, 2006; 6 pages.

* cited by examiner

*Primary Examiner* — Habte Mered

(57) ABSTRACT

Methods and apparatuses for estimating and reducing interference in wireless communication systems are disclosed. As one example, a method for reducing interference in a wireless communication system is disclosed. The method includes the steps of generating a tile for transmission, the tile including a first portion and a second portion, inserting small message information into the first portion or the second portion, if the small message information is inserted into the first portion, inserting data into the second portion, and if the small message information is inserted into the second portion, inserting the data into the first portion.

23 Claims, 9 Drawing Sheets

METHOD AND APPARATUS FOR ESTIMATING AND REDUCING INTERFERENCE IN WIRELESS COMMUNICATION SYSTEMS

CROSS-REFERENCE TO RELATED APPLICATION AND CLAIM FOR PRIORITY

The present application is related to U.S. Provisional Patent Application No. 60/867,436, entitled "METHOD AND APPARATUS TO IMPROVE INTERFERENCE ESTIMATION AND REDUCE INTERFERENCE IN OFDMA SYSTEMS," filed on Nov. 28, 2006, which is assigned to the assignee of the present application. The subject matter disclosed in U.S. Provisional Patent Application No. 60/867,436 is incorporated by reference into the present application as if fully set forth herein. The present application hereby claims priority, under 35 U.S.C. §119(e), to U.S. Provisional Patent Application No. 60/867,436.

FIELD OF THE INVENTION

The invention relates to the telecommunications field, and more particularly, but not exclusively, to a method and apparatus for estimating and reducing interference in wireless communication systems.

BACKGROUND OF THE INVENTION

In wireless communication systems, such as, for example, Orthogonal Frequency Division Multiple Access (OFDMA) systems, interference diversity is an important aspect of system performance. In other words, the ability to measure interference accurately and take advantage of the interference level information is critical to proper system performance. However, when "small" messages (e.g., ACK/NAK, power control, interference control bits, single-bit messages, etc.) are transmitted in these systems, the messages provide very limited samples for interference realization, which leads to increased difficulty in the interference estimation process. Furthermore, these samples may have different interference power levels, which can severely impact the ability of a receiver to detect the single-bit or other small messages involved.

An illustrative example of such a problem is the Reverse link Acknowledgment Channel (R-ACKCH) in the current 3rd Generation Partnership Project 2 (3GPP2) joint framework proposal for the physical layer of the air interface evolution phase 2. Essentially, the R-ACKCH is a portion of a reverse OFDMA channel used for transmitting acknowledgment messages from an Access Terminal (e.g., mobile station, mobile terminal, wireless terminal, etc.) to one or more Access Networks in response to data received on a Forward Packet Data Channel. More precisely, the R-ACKCH is used to acknowledge Forward Link PHY frames transmitted on the Forward Data Channel. In the currently proposed 3GPP2 R-ACKCH design, the R-ACKCH is to be transmitted over 4 frequency tiles.

FIG. 1 is a pictorial diagram depicting the current design 100 of the R-ACKCH for the physical layer of the air interface in the 3GPP2 joint framework proposal. As shown, each R-ACKCH is being transmitted over a tile 102, 104, 106, and each tile 102, 104, 106 is one of four possible tiles. Also, two example tiles 108, 110 are shown. Tile 108 represents a tile that includes only data and pilot signal. Tile 110 represents a tile that includes data and pilot signal in the upper half-tile 110a, and R-ACKCH data in the lower half-tile 110b. Each lower-half tile 110b is further sub-divided into 4 sub-tiles 112, 114, 116, 118. Each sub-tile 112, 114, 116, 118 spans over 8 sub-carriers and 2 OFDM symbols. Each ACK bit to be transmitted will be Discrete Fourier Transform (DFT) pre-coded, and mapped into one of the 4 sub-tiles 112, 114, 116, 118. This process is repeated in each of the four possible tiles so that $4^{th}$ order frequency diversity can be achieved.

In that regard, FIG. 2 is a block diagram depicting the existing transmission processing scheme 200 for the R-ACKCH. First, the ACK bits to be transmitted will be processed through a DFT pre-coder 202. Next, the output of the DFT pre-coder 202 will be input to a mapper 204, which maps the DFT pre-coder output to a sub-tile. The mapped sub-tile 206 is then placed within an ACK tile 208. Note that FIG. 2 only shows the transmission processing scheme for one sub-tile. However, each ACK bit will be transmitted in 4 sub-tiles, and each of the 4 sub-tiles will be located in a different ACK tile. Therefore, the transmission processing scheme 200 shown in FIG. 2 will have to be performed 4 times, or once for each tile. Also, note that the ACK bits that are processed through one DFT pre-coder may or may not be transmitted by the same mobile station.

For example, from the viewpoint of a particular mobile station, i, when an ACK i is transmitted, the ACK i will be transmitted in 4 sub-tiles, with each one using a possibly different DFT pre-coding index. An example of this process is illustrated by the R-ACKCH channel structure 300 shown in FIG. 3. As shown, DFT pre-coding sequence $i_1$ 304a is used for transmitting ACK i in sub-tile 1 306a, DFT pre-coding sequence $i_2$ 304b is used for transmitting ACK i in sub-tile 2 306b, and so on. After the DFT pre-coder output is mapped into a sub-tile, each sub-tile is placed into 1 of the 4 possible sub-tile positions in an ACK tile. For example, sub-tile 1 306a is placed into ACK tile 1 308a, and sub-tile 2 306b is placed into ACK tile 2 308b. Each ACK tile is then hopped 310 over frequency and multiplexed with other reverse channels to maximize frequency diversity and minimize the possibility of collision with other ACK tiles. All of the ACK tiles are then processed through an Inverse Fast Fourier Transformer (IFFT) 312 and a parallel-to-series converter 314.

Notwithstanding the numerous advantages of the existing R-ACKCH transmission scheme and channel structure, it is relatively difficult to implement suitable interference estimation for each sub-tile. For example, in order to estimate interference accurately, 8 out of 16 DFT codes for each sub-tile are to be reserved for interference estimation, which will result in a significant waste of processing resources. Additionally, if the R-ACKCH tiles in different sectors collide, the interference within a tile may not be constant, which will create even more challenges in designing for interference estimation and ACK detection. Therefore, a pressing need exists for a transmission scheme and channel structure that can improve the interference distribution, in order to facilitate interference estimation and enhance the detection of the small messages involved.

SUMMARY OF THE INVENTION

In a first example embodiment, a method for reducing interference in a wireless communication system is provided. The method includes the steps of generating a tile for transmission, the tile including a first portion and a second portion, inserting small message information into the first portion or the second portion, if the small message information is inserted into the first portion, inserting data into the second portion, and if the small message information is inserted into the second portion, inserting the data into the first portion.

In a second example embodiment, a method for reducing interference in a wireless communication system is provided. The method includes the steps of generating a control message, inserting the control message into at least one of an upper half-tile and a lower half-tile, if the control message is inserted into the upper half-tile, inserting traffic data into the lower half-tile, and if the control message is inserted into the lower half-tile, inserting the traffic data into the upper half-tile.

In a third example embodiment, a method for reducing interference in a wireless communication system is provided. The method includes the steps of inputting small message data, DFT pre-coding the small message data, and scrambling the DFT pre-coded small message data.

In a fourth example embodiment, a method for reducing interference in a wireless communication system is provided. The method includes the steps of inputting small message data, DFT pre-coding the small message data, and interleaving the DFT pre-coded small message data.

In a fifth example embodiment, an apparatus for reducing interference in a wireless communication system is provided. The apparatus includes a DFT pre-coder unit configured to spread a plurality of input small message bits, a scrambler unit coupled to an output of the DFT pre-coder unit and configured to scramble the spread small message bits, a mapper unit coupled to an output of the scrambler unit and configured to map the scrambled small message bits to a sub-tile, and a processing unit coupled to an output of the mapper unit and configured to insert the sub-tile into an upper half or lower half of a tile.

In a sixth example embodiment, an apparatus for reducing interference in a wireless communication system is provided. The apparatus includes a DFT pre-coder unit configured to spread a plurality of input small message bits, an interleaver unit coupled to an output of the DFT pre-coder unit and configured to interleave the spread small message bits, a mapper unit coupled to an output of the interleaver unit and configured to map the interleaved small message bits to a sub-tile, and a processing unit coupled to an output of the mapper unit and configured to insert the sub-tile into an upper half or lower half of a tile.

In a seventh example embodiment, an apparatus for reducing interference in a wireless communication system is provided. The apparatus includes a DFT pre-coder unit configured to spread a plurality of input small message bits, a scrambler unit coupled to an output of the DFT pre-coder unit and configured to scramble the spread small message bits, an interleaver unit coupled to an output of the scrambler unit and configured to interleave the scrambled small message bits, a mapper unit coupled to an output of the interleaver unit and configured to map the interleaved small message bits to a sub-tile, and a processing unit coupled to an output of the mapper unit and configured to insert the sub-tile into an upper half or lower half of a tile.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
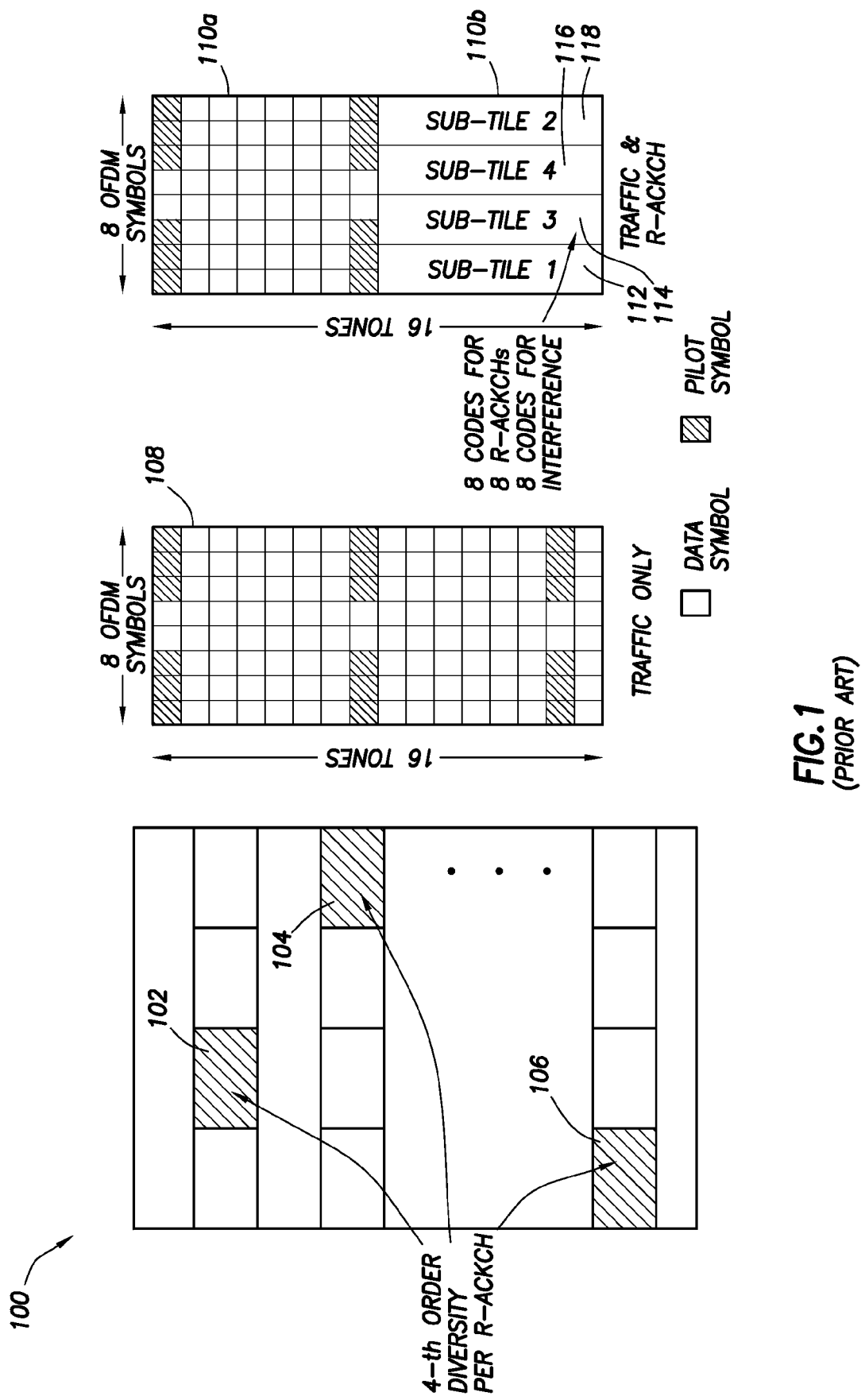
FIG. 1 depicts is a pictorial diagram depicting the current design of the R-ACKCH for the air interface proposal in the 3GPP2.
Figure 2:
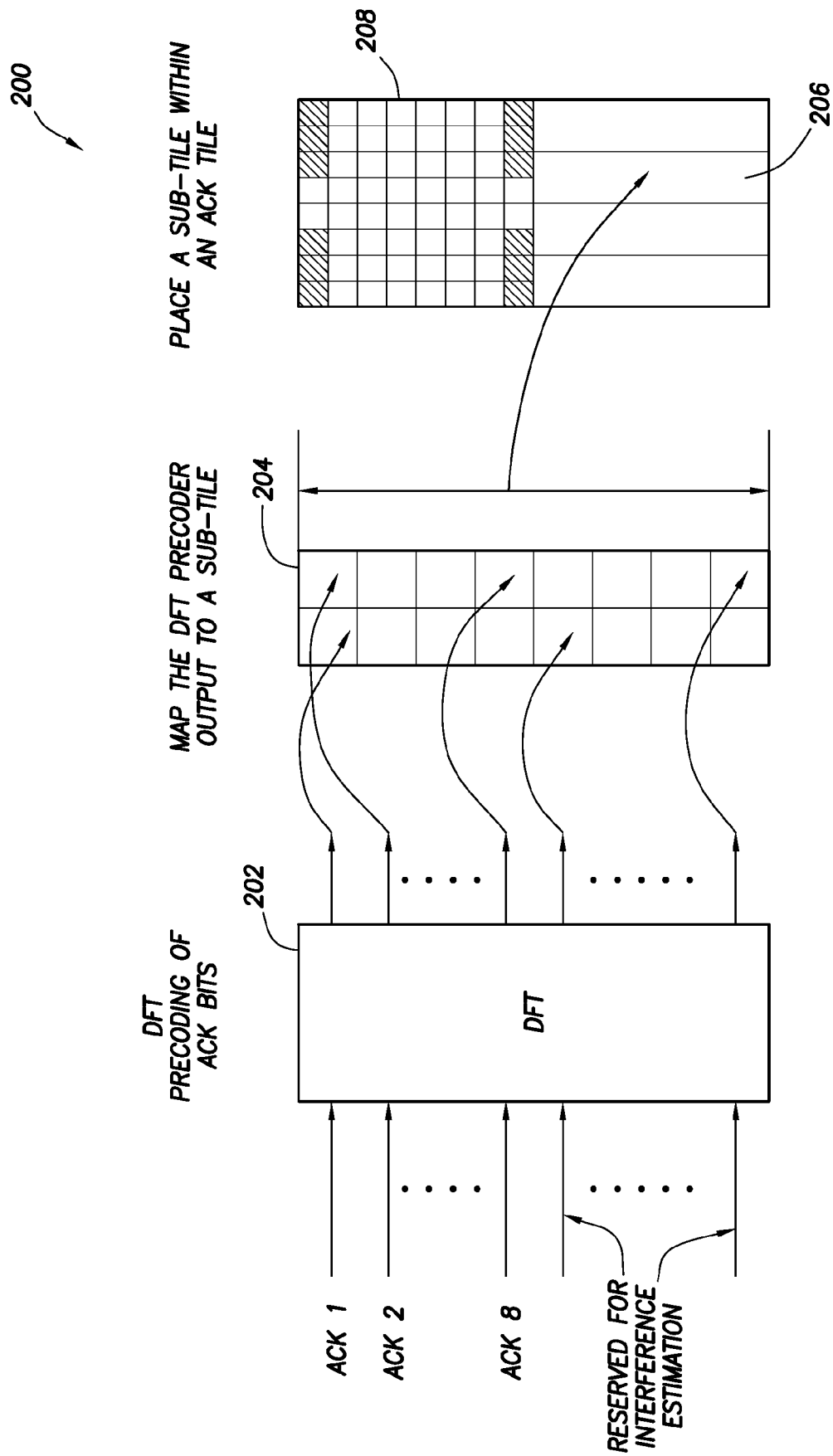
FIG. 2 is a block diagram depicting the existing transmission processing scheme for the R-ACKCH.
Figure 3:
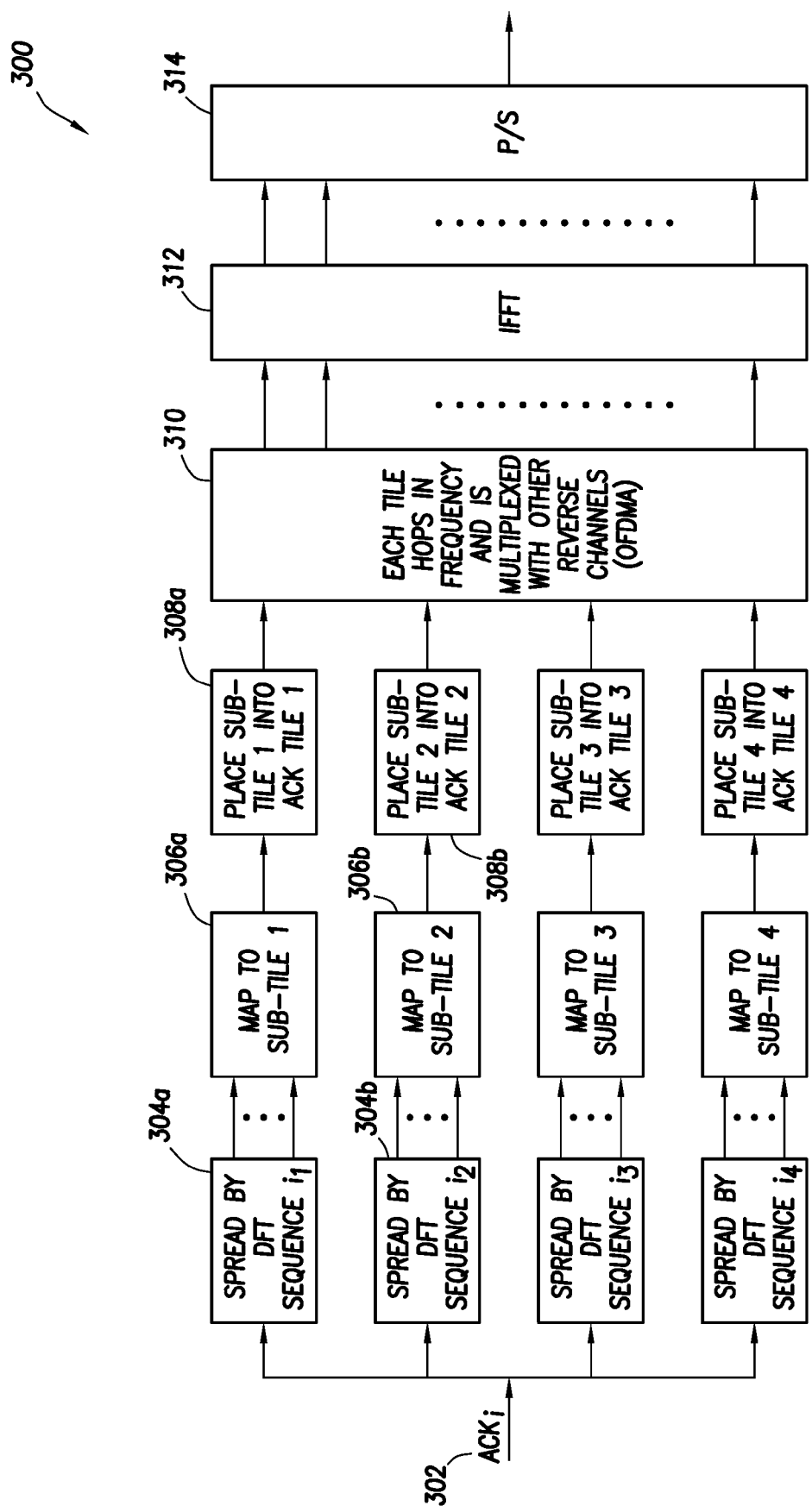
FIG. 3 depicts a block diagram that illustrates a problem that exists with the R-ACKCH channel structure shown in FIG. 2.
Figure 4:
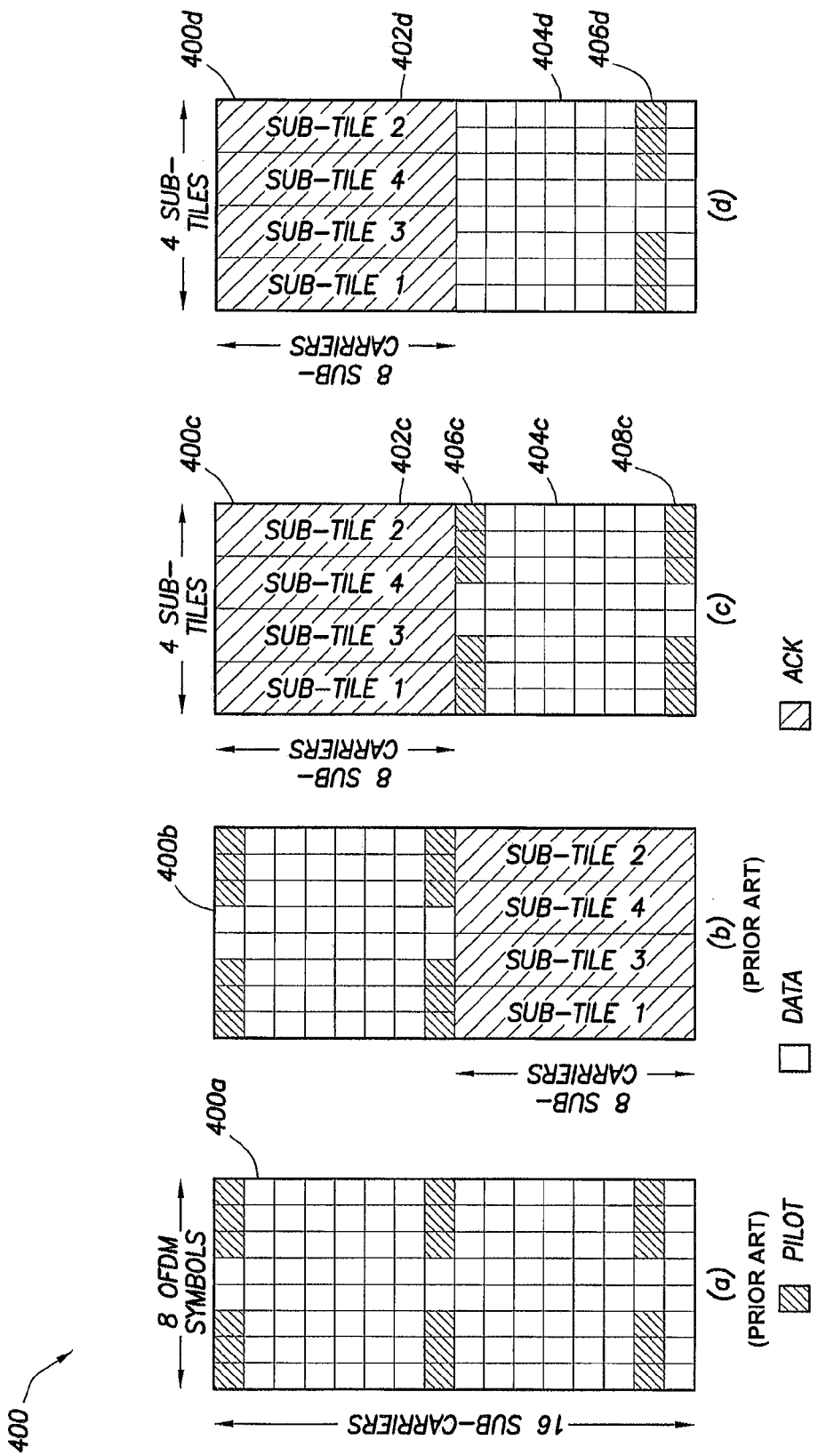
FIG. 4 is a pictorial diagram depicting a plurality of tile structures, which illustrate key principles of one or more example embodiments of the present invention.

With reference again to the figures, FIG. 4 is a pictorial diagram 400 depicting a plurality of tile structures 400a, 400b, 400c and 400d, which illustrate key principles of one or more example embodiments of the present invention. For some example embodiments, tiles 400b, 400c and 400d may be used as R-ACKCH tiles for improving interference distribution in OFDMA systems, in order to facilitate interference estimation and improve the detection of small messages. However, it should be understood that the present invention is not intended to be so limited, and can include within its scope any other suitable use of small messages, channels and/or wireless systems in which tile structures, frame structures, or other similar transmission media or structures are used.

Tile structures 400a, 400b are existing tile structures to be used for data channel and R-ACKCH transmissions, and are provided at this point to help clarify the descriptions of the example embodiments of the combinations of tile structures 400b, 400c and 400d. For example, tile structure 400a includes only data and pilot signal for transmission. The lower half of tile structure 400b includes the ACK tile structure proposed in the 3GPP2 joint framework proposal for the physical layer of the air interface evolution phase 2. Each mobile station is assigned 4 sub-tiles to send its R-ACKCH message on. Note that the upper half of tile structure 400b is to be used for data transmission.

For one or more example embodiments, tile structure 400c represents a new ACK tile structure, which includes 4 sub-tiles for the R-ACKCH in the upper half-tile 402c, and data and pilot signal in the lower half-tile 404c. In this illustrative example, the pilot signal is included in 6 OFDM symbols in each of 2 sub-carriers 406c, 408c. Note that data and pilot are located in the upper half-tile in 400b, and in the lower half-tile of 400c. The design of the lower half-tile of 400c has the same structure as the upper half-tile of 400b. This provides potential benefits in simplifying the receiver design, because the same or similar algorithm and processing can be used for data and pilot in the upper half-tile in 400b and in the lower half-tile in 400c. Tile structure 400d also represents a new ACK tile structure, which also includes 4 sub-tiles for the R-ACKCH in the upper half-tile 402d, and data and pilot signal in the lower half-tile 404d. However, in this illustrative example, the pilot signal is included in 6 OFDM symbols in 1 sub-carrier 406d. Note that in another example embodiment, tile structure 400d may be inverted so that the 4 sub-tiles for the R-ACKCH are included in the lower half-tile 404d, and the data and pilot signal are included in the upper half-tile 402d. Also, in yet another example embodiment, the pilot signal may be included in 4 OFDM symbols in each of 3 sub-carriers in either an upper or lower half-tile. In other words, the pilot signal for the channel involved may be included as any suitable number of OFDM symbols in any suitable number of sub-carriers in an upper half-tile or lower half-tile.

Thus, in accordance with key principles of the present invention, the tile structures 400c, 400d depicted in the example embodiments shown in FIG. 4 can be used to transmit an R-ACKCH in either an upper half-tile or lower half-tile, which reduces the probability of an ACK tile collision by one-half over the prior ACK tile transmission schemes. In a broader sense, the embodiments of the present invention provide tile structures that can be used to transmit an R-ACKCH in an upper half-tile or lower half-tile of any suitable tile structure. In other words, the transmission of the R-ACKCH (or any other suitable channel) is not limited just to the use of a lower half-tile.

For example, assume there are 30 tiles used for a 5 MHz system. The R-ACKCH takes up 4 half-tiles, so the probability of an ACK tile collision between two sectors in a conventional system is 4/30=13%. However, with the added flexibility of using the upper half-tile and lower half-tile ACK tile structures, such as, for example, the tile structures 400b, 400c or 400d, the ACK tile collision probability is reduced to 4/60=6.7%.

For one or more example embodiments, in order to take advantage of the new ACK tile structures 400c, 400d, a hopping sequence for the R-ACKCH may be defined that can decide whether the R-ACKCH is to be included in the upper or lower portion of an ACK tile in each physical layer frame. The hopping sequence may be randomized across sectors in order minimize the probability of collision. In another embodiment, the R-ACKCH hopping pattern across sectors may be coordinated. For example, in a 5 MHz system, each ACK tile can hop over the 30 available tiles. The hopping sequence of the R-ACKCH tiles can be commonly defined for neighboring sectors. Each sector can use 4 ACK tile hopping sequences for the 4 R-ACKCH tiles. As long as the neighboring sectors use different ACK tile hopping sequences, the probability of ACK tile collisions among the neighboring sectors can be eliminated.

Figure 5:
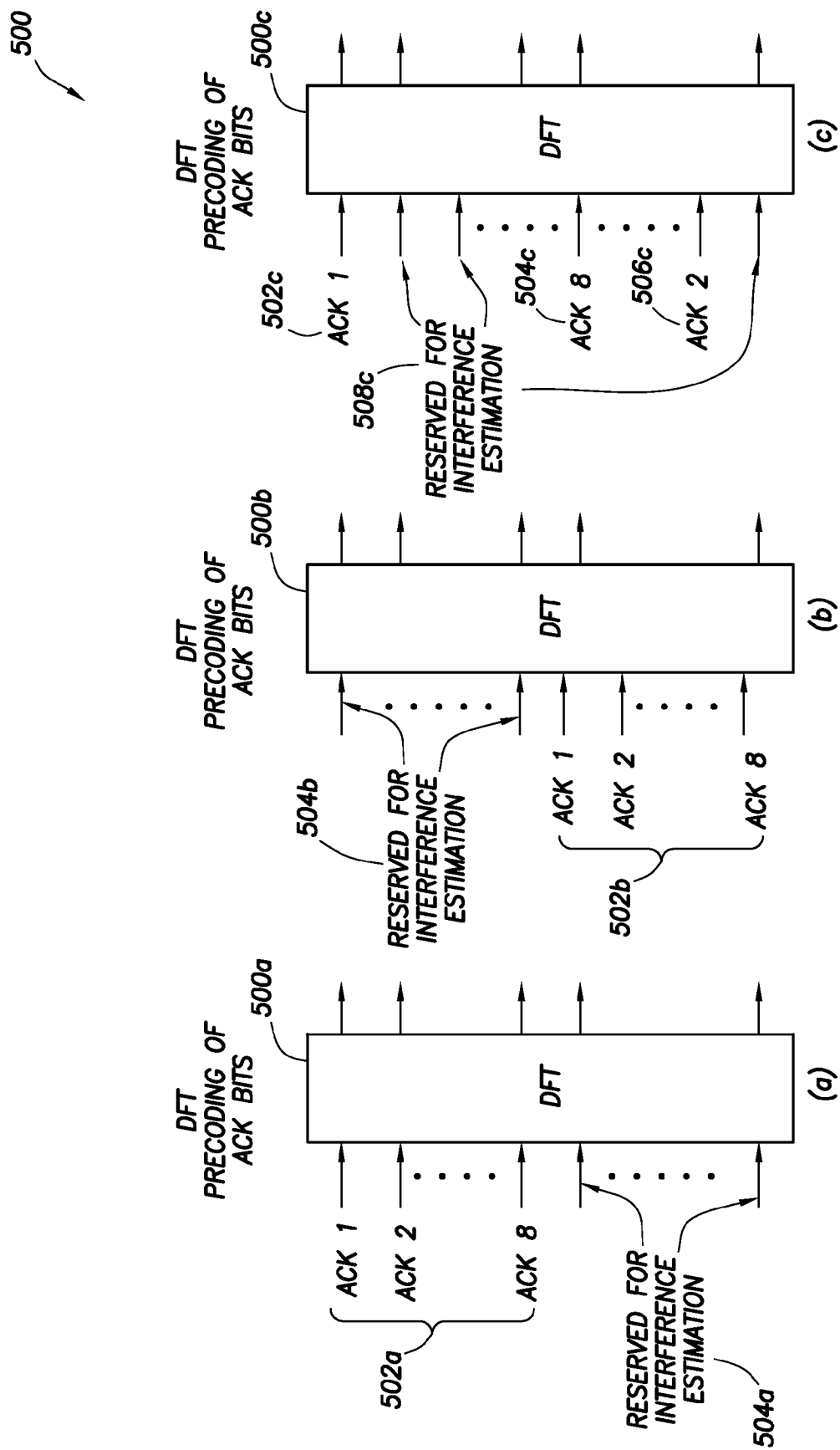
FIG. 5 is a block diagram depicting a plurality of DFT pre-coders and pre-coding methods, which illustrate key principles of one or more example embodiments of the present invention.

FIG. 5 is a block diagram 500 depicting a plurality of DFT pre-coders and pre-coding methods 500a, 500b and 500c, which illustrate key principles of one or more example embodiments of the present invention. For some example embodiments, DFT pre-coders and methods 500b and 500c may be used for DFT pre-coding of ACK bits in OFDMA systems, in order to facilitate interference estimation and improve the detection of small messages. However, it should be understood that the present invention is not intended to be so limited, and can include within its scope any other suitable use of DFT pre-coding in wireless systems in which tiles or other similar transmission media are used.

The DFT pre-coder and method 500a show in FIG. 5 represent a conventional technique used for pre-coding of ACK bits, and are provided at this point to help clarify the descriptions of the example embodiments of DFT pre-coders and methods 500b and 500c. For example, DFT pre-coder and method 500a represents the current R-ACKCH design in the 3GPP2 joint framework proposal for the physical layer of the air interface evolution phase 2. As shown, only the lowest 8 DFT pre-coding sequences 502a can be used for ACK bit transmissions, and the highest 8 DFT pre-coding sequences 504a are reserved for interference estimation.

For one or more example embodiments, DFT pre-coders and methods 500b and 500c represent new DFT pre-coding techniques that enable the use of different sets of pre-coding sequences for ACK bit transmissions in different sectors of a wireless communication system, such as, for example, an OFDMA system. For example, it may be assumed that a 16-bit DFT pre-coding process is being used, and the DFT pre-coding sequences are identified as $\{D_0, D_1, \ldots, D_{15}\}$. Note that in the illustrative example embodiment of DFT pre-coder and method 500b, a sector may use one or more of DFT pre-coding sequences $\{D_8, D_9, \ldots, D_{15}\}$ 502b for ACK bit transmissions, and reserve DFT pre-coding sequences $\{D_0, D_1, \ldots, D_7\}$ 504b for interference estimation.

In a different embodiment, as illustrated by the exemplary DFT pre-coder and method 500c, the set of DFT pre-coding sequences used for ACK bit transmissions in each sector may be randomized. In this case, a sector may randomly select up to 8 (or any other suitable number) of the 16 possible DFT pre-coding sequences for ACK bit transmissions. The sector may use the remaining (or a portion of the remaining) DFT pre-coding sequences for interference estimation. Using this technique, the probability of ACK bit collisions between two sectors can be reduced by half with respect to prior techniques. For example, the diagram for exemplary DFT pre-coder and method 500c shows a sector randomly selecting DFT pre-coding sequences 502c, 504c, 506c for transmission of ACK bits 1, 8, 2, and randomly reserving (out of the remainder) 3 DFT pre-coding sequences (indicated generally by numeral 508c) for interference estimation.

Figure 6:
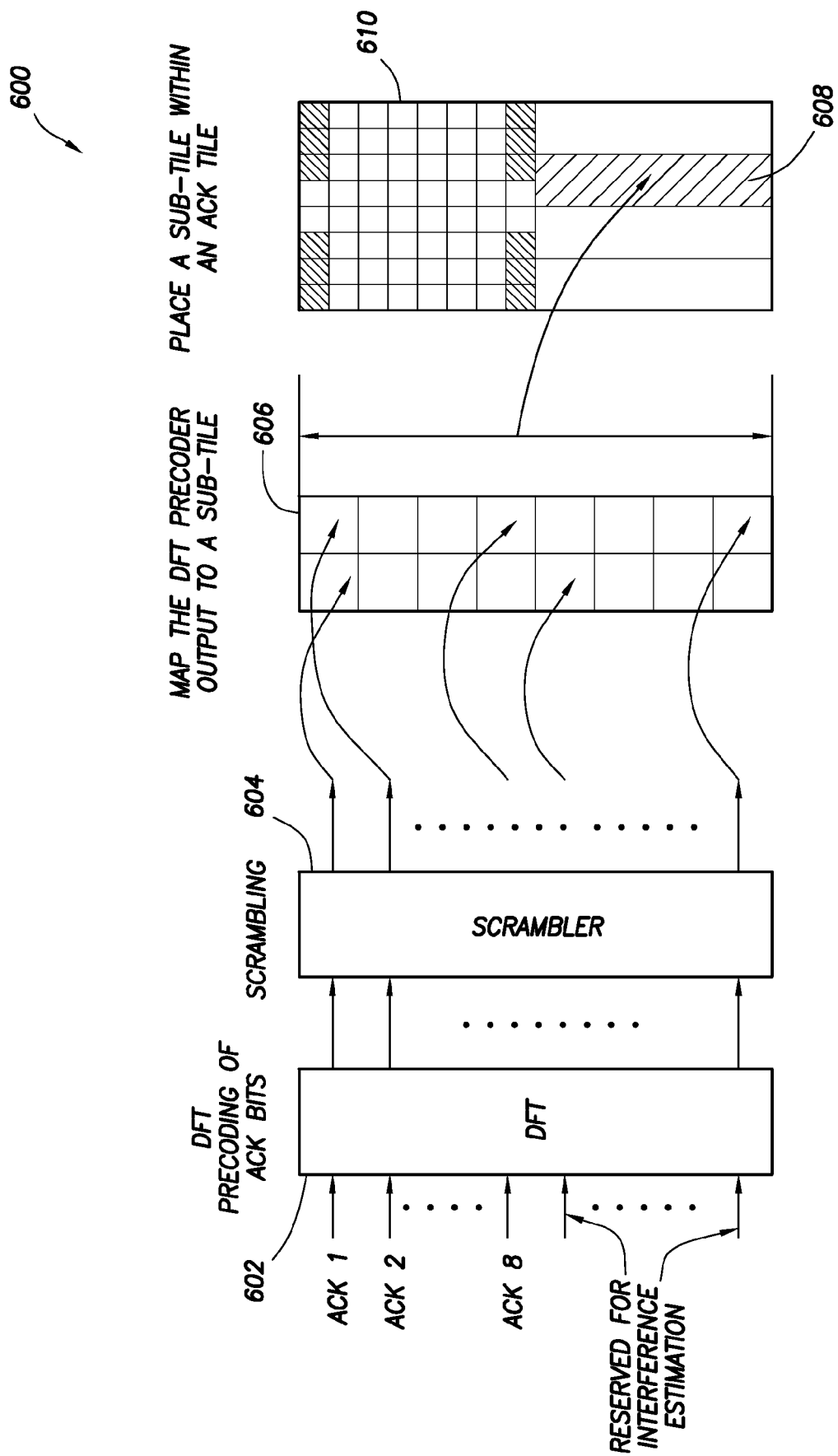
FIG. 6 is a block diagram depicting an apparatus and method for estimating and reducing interference in wireless communication systems, which can be used to implement one or more example embodiments of the present invention

FIG. 6 is a block diagram depicting an apparatus and method 600 for estimating and reducing interference in wireless communication systems, which can be used to implement one or more example embodiments of the present invention. For example, the apparatus and method shown in FIG. 6 may be used for transmission of ACK bits over an R-ACKCH in an OFDMA system, in order to facilitate interference estimation and improve the detection of small messages. However, it should be understood that the present invention is not intended to be so limited, and can include within its scope any other suitable apparatus and/or technique for transmitting data in wireless systems in which tiles or other similar transmission media are used.

Referring to FIG. 6, for one or more example embodiments, an apparatus and method 600 are shown including a DFT 602 for DFT pre-coding of ACK bits for transmission, and a scrambler 604 for scrambling the outputs received from the DFT 602, in order to average out the potential interference from colliding ACK tiles. Without the scrambling function provided by scrambler 604, if an ACK tile collision were to occur between two sectors, the $i^{th}$ DFT pre-coding sequence in one sector would collide exactly with the $i^{th}$ DFT pre-coding sequence in the other sector in the same sub-tile. If both of these DFT pre-coding sequences were to be modulated with ACK bits, then the two ACK bits would collide. Typically, the transmission power of an interfering ACK bit is relatively high. Consequently, if the ACK bit of interest has no additional error protection such as Forward-Error-Correcting (FEC) coding, the negative impact of this collision is likely significant. Thus, as illustrated by the example embodiments shown in FIG. 6, the R-ACKCH in each sector may be scrambled (604) by a sector-specific random sequence or a pseudo-random sequence, and then mapped 606 (e.g., by a suitable mapping device) to a sub-tile. The mapped sub-tile 608 is then placed within an ACK tile 610.

By using the above-described technique of scrambling the R-ACKCH in each sector by a sector-specific random sequence or a pseudo-random sequence, a collision of ACK tiles between two sectors will occur only at the sub-tile level. In other words, even if a DFT pre-coding sequence is used for ACK transmission in the interfering sector and the interference is relatively strong, the interference level perceived by the same DFT pre-coding sequence in this sector will be significantly reduced. For example, using a 16-bit DFT, the interference level will be reduced by 10*log 10(16)≈12 dB. Furthermore, the interference resulting from one relatively strong ACK interference occurrence from the other sector will now be equally spread out over all of the DFT pre-coding sequences in the first sector, which means that every DFT pre-coding sequence will experience the same amount of interference from this ACK interference occurrence. As a result, the embodiments implemented with the apparatus and method depicted in FIG. 6 provide significantly more accurate interference estimation using the reserved DFT pre-coding sequences than the prior interference estimation techniques.

Figure 7:
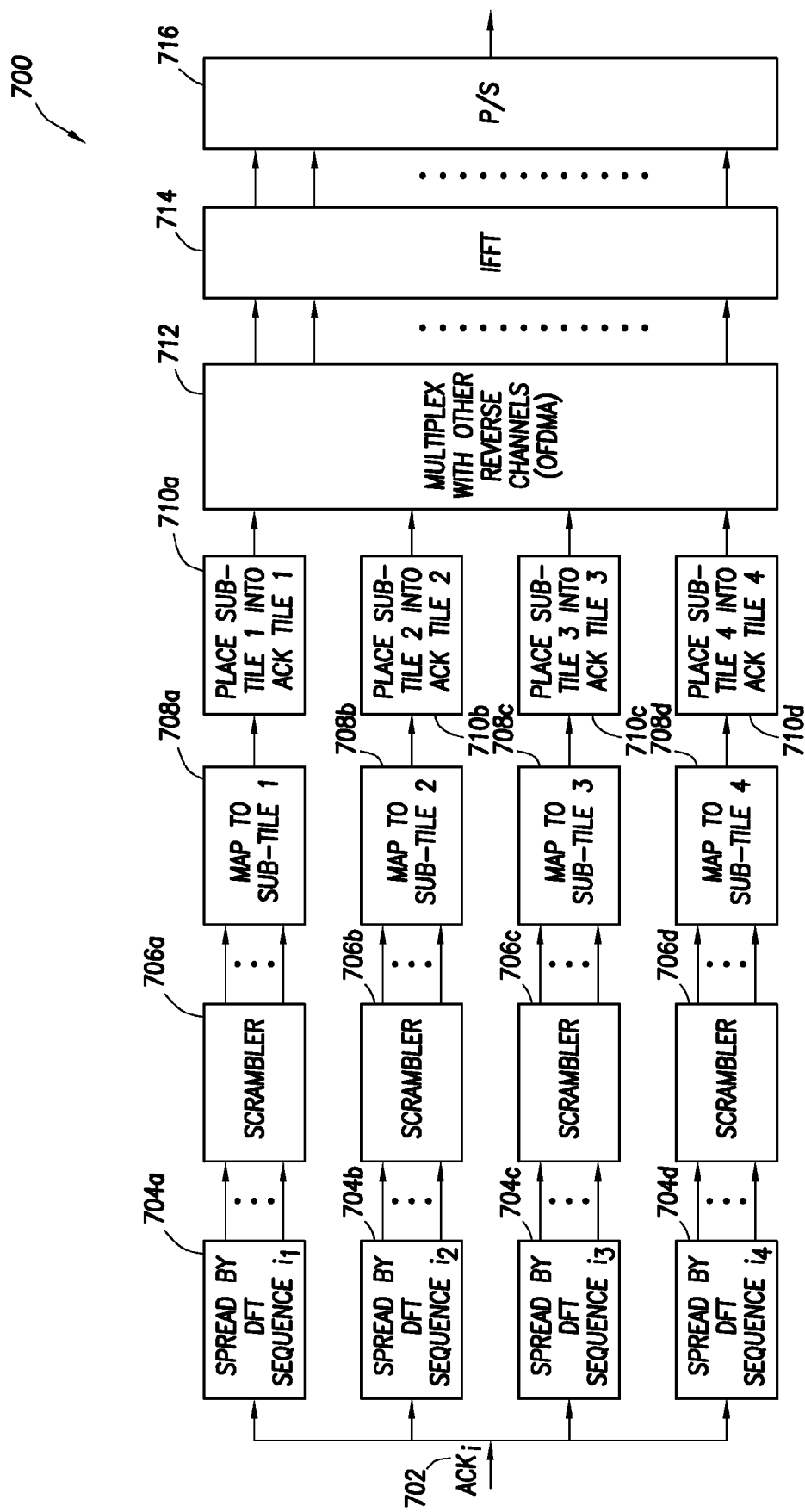
FIG. 7 is a block diagram depicting a channel structure with DFT pre-coding sequence scrambling, which can be used to implement one or more example embodiments of the present invention.

FIG. 7 is a block diagram depicting a channel structure 700 with DFT pre-coding sequence scrambling, which can be used to implement one or more example embodiments of the present invention. For example, the channel structure 700 shown in FIG. 7 may be used to implement one or more example embodiments of the apparatus and method 600 shown in FIG. 6. As such, channel structure 700 may be used for transmission of ACK bits over an R-ACKCH in an OFDMA system, in order to facilitate interference estimation and improve the detection of small messages. However, it should be understood that the present invention is not intended to be so limited, and can include within its scope any other suitable channel structure for transmitting data in wireless systems in which tiles or other similar transmission media are used.

Referring to FIG. 7, for one of more example embodiments, channel structure 700 includes a plurality of DFT pre-coder segments 704a through 704d. Each DFT pre-coder segment 704a through 704d functions to spread an input $i^{th}$ ACK bit 702 by a respective DFT pre-coding sequence $i_1$ through $i_4$. Note that although 4 DFT pre-coder segments 704a through 704d (e.g., representing 4 different sectors) are shown, the present invention is not intended to be so limited and can include any suitable number of DFT pre-coder segments 702n, where "n" is equal to the total number of sectors involved.

The spread ACK bits $i_1$ through $i_4$ are coupled to a plurality of scramblers 706a through 706d, which scramble the DFT pre-coder outputs by a sector-specific random sequence. The scrambled DFT pre-coded ACK bits are then coupled to a plurality of mappers and mapped to a plurality of sub-tiles 708a through 708d. A processor then places each of the four sub-tiles into one of four ACK tiles 710a through 710d. Each ACK tile is then multiplexed 712 with other reverse channels. All of the ACK tiles are then processed through an IFFT 714 and a parallel-to-series converter 716.

As illustrated by FIG. 7, a mobile station that transmits an ACK i bit may use a sector-specific sequence to scramble the DFT pre-coder output for each sub-tile. As such, the scrambling sequence used for each DFT pre-coder 704a through 704d may or may not be the same. Note that, as a technical matter (not intended as a limitation on the invention), the scrambling sequence is sector-specific so that the orthogonality between the DFT pre-coding sequences within the same sector is preserved. However, the scrambling sequences used in different sectors are preferably different so that interference between sectors can be minimized. Optionally, the scrambling sequences may be changed over time.

Figure 8:
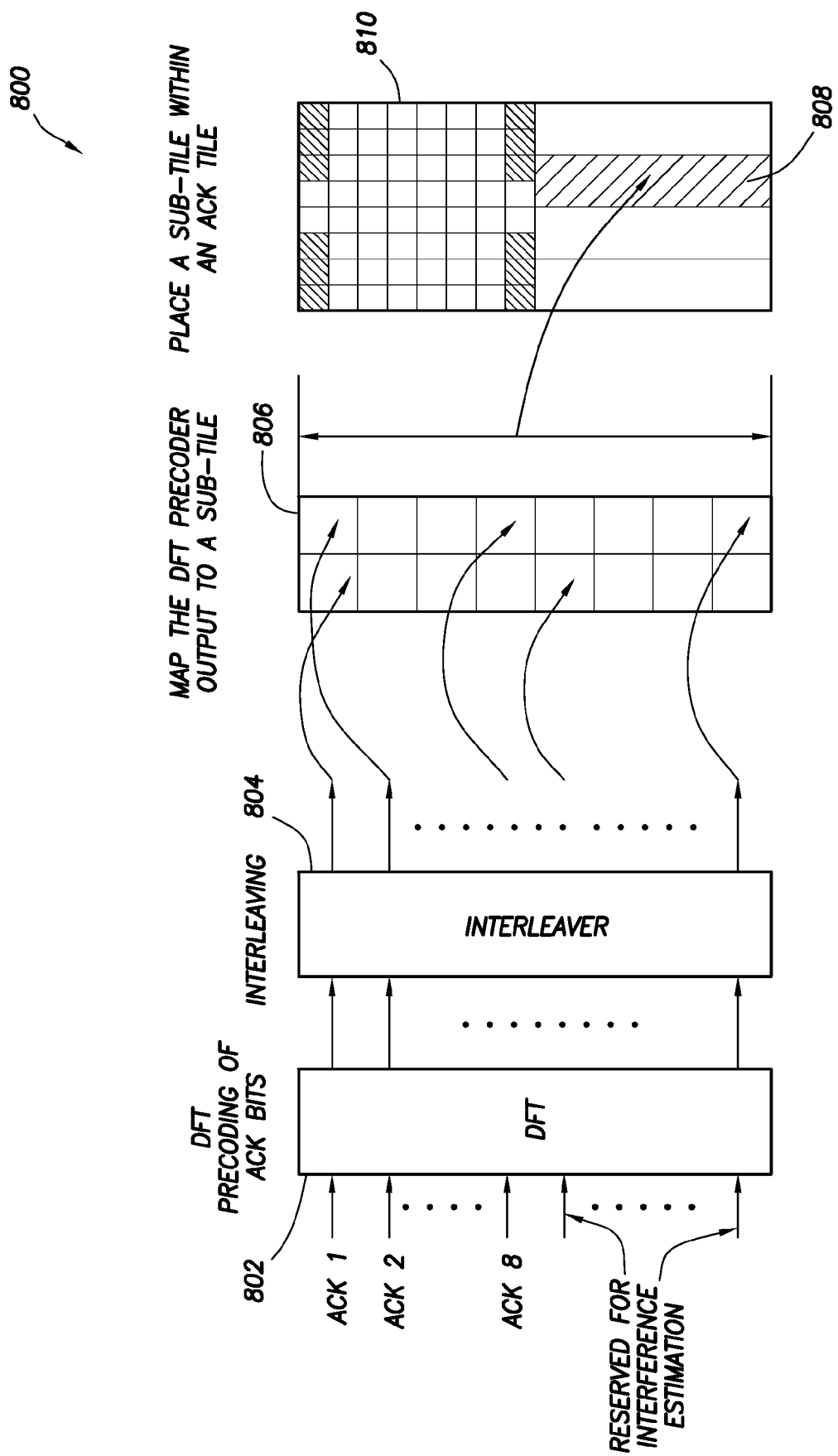
FIG. 8 is a block diagram depicting an apparatus and method for estimating and reducing interference in wireless communication systems, which can be used to implement one or more example embodiments of the present invention.

FIG. 8 is a block diagram depicting an apparatus and method 800 for estimating and reducing interference in wireless communication systems, which can be used to implement one or more example embodiments of the present invention. For example, the apparatus and method shown in FIG. 8 may be used for transmission of ACK bits over an R-ACKCH in an OFDMA system, in order to facilitate interference estimation and improve the detection of small messages. However, it should be understood that the present invention is not intended to be so limited, and can include within its scope any other suitable apparatus and/or technique for transmitting data in wireless systems in which tiles or other similar transmission media are used.

Referring to FIG. 8, for one or more example embodiments, an apparatus and method 800 are shown including a DFT 802 for DFT pre-coding of ACK bits for transmission, and an interleaver 804 for interleaving the outputs received from the DFT 602. Essentially, interleaving is the process of permuting the sequence of symbols. As shown, the output of the DFT pre-coder 802 for each sub-tile is interleaved, in order to average out the interference from colliding ACK tiles. Without interleaving, if an ACK tile collision between two sectors was to occur, the DFT pre-coding sequence, i, in one sector would collide exactly with the DFT pre-coding sequence, i, in the other sector in the same sub-tile. If both of the DFT pre-coding sequences were modulated with ACK bits, then these two ACK bits would collide. The interfering ACK bit transmission power is typically high, and the ACK bit of interest has no additional error protection (e.g., FEC coding), thus the negative impact of this collision is likely significant. The interleaved outputs (804) of the DFT pre-coder are then mapped 806 (e.g., by a suitable mapping device) to a sub-tile. The mapped sub-tile 808 is then placed within an ACK tile 810.

For the example embodiments depicted in FIG. 8, the R-ACKCH in each sector is interleaved by a sector-specific interleaver. At this point, it is important to note that sector-specific interleaving can mean the use of the same interleaver within a sector so that the orthogonality between the DFT pre-coding sequences within the same sector is preserved, and is not limited to use of different interleavers across different sectors. Also, it should be understood that although the embodiments depicted in FIG. 8 preferably include sector-specific interleavers, the present invention is not intended to be so limited and can also include interleavers that are not sector-specific. For example, an Access Terminal-specific interleaver can be used if the interference across Access Terminals is not a concern, or can be sufficiently randomized and suppressed.

Referring to FIG. 8, for some embodiments, the output of the DFT pre-coder 802 is interleaved by a sector-specific interleaver 804 before being mapped to a sub-tile 806. Thus, by using this technique, a collision of ACK tiles between two sectors will occur only at the sub-tile level. In other words, even if a DFT pre-coding sequence is used for ACK transmission in the interfering sector and the interference is relatively strong, the interference level perceived by the same DFT pre-coding sequence in this sector will be significantly reduced. For example, using a 16-bit DFT, the interference level will be reduced by 10*log 10(16)≈12 dB. Furthermore, the interference resulting from one relatively strong ACK interference occurrence from the other sector will now be equally spread out over all of the DFT pre-coding sequences in the first sector, which means that every DFT pre-coding sequence will experience the same amount of interference from this ACK interference occurrence. As a result, the embodiments implemented with the apparatus and method depicted in FIG. 8 provide significantly more accurate interference estimation using the reserved DFT pre-coding sequences than the prior interference estimation techniques.

Another benefit of using the interleaving technique depicted in FIG. 8 is related to the averaging of the co-channel interference between the DFT pre-coding sequences. For example, the DFT pre-coding sequences are orthogonal. However, because each sub-tile experiences time-varying and frequency-selective fading, the orthogonality between the pre-coding sequences is destroyed, which results in interference between the DFT pre-coding sequences (referred to as co-channel interference). Using the interleaving approach depicted in FIG. 8, the co-channel interference can be significantly reduced. Furthermore, using this interleaving approach, the co-channel interference between any two DFT pre-coding sequences becomes roughly the same, which improves the performance of the interference estimation process. As a result, the performance of the R-ACKCH is improved.

Figure 9:
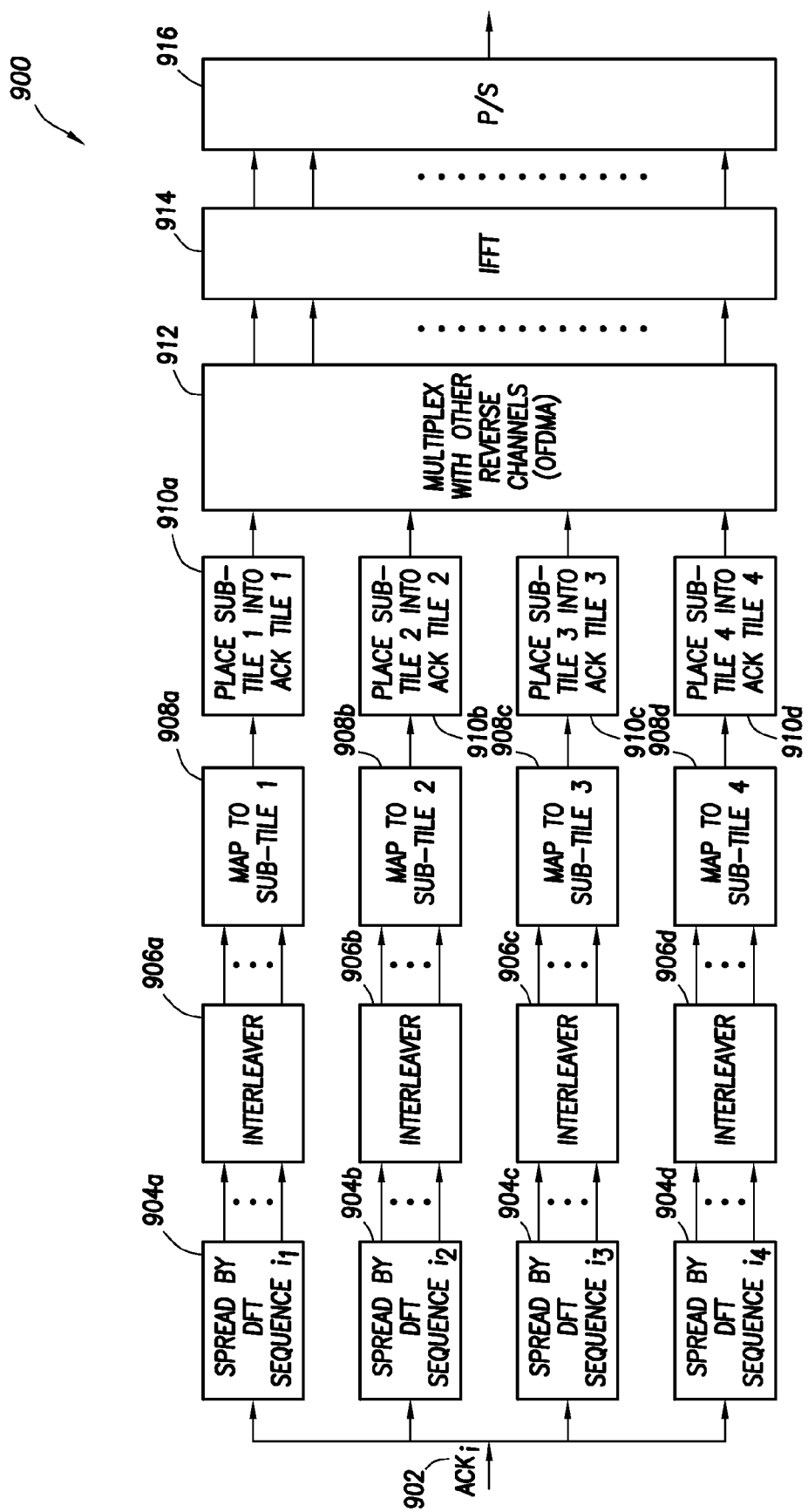
FIG. 9 is a block diagram depicting a channel structure with DFT pre-coding sequence interleaving, which can be used to implement one or more example embodiments of the present invention.

FIG. 9 is a block diagram depicting a channel structure 900 with DFT pre-coding sequence interleaving, which can be used to implement one or more example embodiments of the present invention. For example, the channel structure 900 shown in FIG. 9 may be used to implement one or more example embodiments of the apparatus and method 800 shown in FIG. 8. As such, channel structure 900 may be used for transmission of ACK bits over an R-ACKCH in an OFDMA system, in order to facilitate interference estimation and improve the detection of small messages. However, it should be understood that the present invention is not intended to be so limited, and can include within its scope any other suitable channel structure for transmitting data in wireless systems in which tiles or other similar transmission media are used.

Referring to FIG. 9, for one of more example embodiments, channel structure 900 includes a plurality of DFT pre-coder segments 904a through 904d. Each DFT pre-coder segment 904a through 904d functions to spread an input $i^{th}$ ACK bit 902 by a respective DFT pre-coding sequence $i_1$ through $i_4$. Note that although 4 DFT pre-coder segments 904a through 904d (e.g., representing 4 different tiles) are shown, the present invention is not intended to be so limited and can include any suitable number of DFT pre-coder segments 902n, where "n" is equal to the total number of tiles involved.

The spread ACK bits $i_1$ through $i_4$ are coupled to a plurality of interleavers 906a through 906d, which interleave the DFT pre-coder outputs by a sector-specific interleaver. Again, note that sector-specific interleaving can mean the use of the same interleaver within a sector so that the orthogonality between the DFT pre-coding sequences within the same sector is preserved, and is not limited to use of different interleavers across different sectors. The same sector-specific interleaver can be used across different sectors due to certain considerations such as ease of implementation, or in cases where interference between sectors is already randomized by other means. Also, note that although the embodiments depicted in FIG. 9 preferably include sector-specific interleavers, the present invention is not intended to be so limited and can also include interleavers that are not sector-specific. For example, an Access Terminal-specific interleaver can be used if the interference across Access Terminals is not a concern, or can be sufficiently randomized and suppressed.

In any event, the interleaved DFT pre-coded ACK bits are then coupled to a plurality of mappers and mapped to a plurality of sub-tiles 908a through 908d. A processor then places each of the four sub-tiles into one of four ACK tiles 910a through 910d. Each ACK tile is then multiplexed 912 with other reverse channels. All of the ACK tiles are then processed through an IFFT 914 and a parallel-to-series converter 916.

As illustrated by FIG. 9, a mobile station that transmits an ACK i bit may use a sector-specific interleaver to interleave the DFT pre-coder output for each sub-tile. As such, the interleaver used for each DFT pre-coder 904a through 904d may or may not be the same. Note that, as a technical matter (not intended as a limitation on the invention), the interleaver is sector-specific so that the orthogonality between the DFT pre-coding sequences within the same sector is preserved. However, the interleavers used in different sectors are preferably different so that interference between sectors can be minimized. Optionally, the interleaver used in each sector may be changed over time.

Notably, the interleavers 906a through 906d may also be interpreted as hopping sequences for the DFT pre-coder output. For example, assume that a 16-bit DFT pre-coder is being used, and each sub-tile spans 8 sub-carriers and 2 OFDM symbols. Thus, the 16 DFT pre-coder output bits can hop over the 16 sub-carrier positions within a sub-tile. Consequently, the hopping sequences for the 16 DFT pre-coder output bits should not collide. Preferably, the hopping sequences across sectors are randomized in order to minimize other-sector interference. Also, note that each of the interleavers 906a through 906d may also be interpreted as a mapping function that maps the DFT pre-coder output to sub-carrier positions of a sub-tile. With that interpretation, the interleaving or hopping process becomes a process of using different mapping functions of the DFT pre-coder output to sub-tile sub-carrier positions in different sectors.

It is important to note that as an extension of the principles of the present invention, the above-described embodiments may be combined in different ways. For example, in accordance with another example embodiment, a new channel structure for the R-ACKCH may include a DFT pre-coder whose outputs are input to a scrambler, the outputs of the scrambler are then input to an interleaver, the interleaved (and scrambled) DFT pre-coder outputs are mapped to sub-tiles, and each sub-tile is placed within an upper half-tile or lower half-tile of an ACK tile for transmission. Thus, the advantages of using both a scrambler and interleaver are provided. Also, note that the above-described embodiments may be used for other channels on a reverse link or a forward link, and may also be used for communication systems other than OFDMA systems.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for reducing interference in a wireless communication system, the method comprising:
   generating a plurality of tiles for transmission, each tile including an upper half-tile and a lower half-tile, the upper half-tile comprising sub-carriers with frequencies that are higher than the frequencies of the sub-carriers of the lower half-tile;
   defining a hopping sequence for small messages, wherein the hopping sequence is different from hopping sequences used in neighboring sectors to reduce the possibility of collisions;
   based on the hopping sequence, inserting a small message into only the upper half-tile of a first tile and inserting pilot information into only the lower half-tile of the first tile; and
   based on the hopping sequence, inserting the small message into only the lower half-tile of a second tile and inserting pilot information into only the upper half-tile of the second tile.

2. The method of claim 1, wherein a structure of the pilot information inserted in the lower half-tile of the first tile is identical to a structure of the pilot information inserted in the upper half-tile of the second tile.

3. The method of claim 1, wherein the small message comprises forward or reverse channel information.

4. The method of claim 1, wherein the small message comprises R-ACKCH information.

5. The method of claim 1, further comprising inserting traffic data into the lower half-tile of the first tile and the upper half-tile of the second tile.

6. The method of claim 1, further comprising:
   inserting the small message into at least one sub-tile of the upper half-tile of the first tile; and
   inserting the small message into at least one sub-tile of the lower half-tile of the second tile.

7. The method of claim 1, wherein the tile includes 16 sub-carriers, each sub-carrier includes 8 OFDM symbols, and the wireless communication system is an OFDMA system.

8. A method for reducing interference in a wireless communication system, the method comprising:
   generating a plurality of tiles for transmission;
   defining a hopping sequence for control messages, wherein the hopping sequence is different from hopping sequences used in neighboring sectors to reduce the possibility of collisions;
   based on the hopping sequence, inserting a control message into only an upper half-tile and pilot information into only a lower half-tile of a first tile, the upper half-tile comprising sub-carriers with frequencies that are higher than the frequencies of the sub-carriers of the lower half-tile; and
   based on the hopping sequence, inserting the control message into only the lower half-tile and pilot information into only the upper half-tile of a second tile.

9. The method of claim 8, wherein the control message comprises forward or reverse control channel information.

10. The method of claim 8, wherein the control message comprises R-ACKCH information.

11. A method for reducing interference in a wireless communication system, the method comprising:
    defining a hopping sequence for small messages, wherein the hopping sequence is different from hopping sequences used in neighboring sectors to reduce the possibility of collisions;
    inputting small message data;
    DFT pre-coding the small message data;
    scrambling the DFT pre-coded small message data;
    interleaving the scrambled small message data;
    generating a plurality of tiles for transmission, each tile including an upper half-tile and a lower half-tile, the upper half-tile comprising sub-carriers with frequencies that are higher than the frequencies of the sub-carriers of the lower half-tile;
    based on the hopping sequence, inserting the interleaved small message data into only the upper half-tile of a first tile and inserting pilot information into only the lower half-tile of the first tile; and
    based on the hopping sequence, inserting the interleaved small message data into only the lower half-tile of a second tile and inserting pilot information into only the upper half-tile of the second tile.

12. The method of claim 11, further comprising mapping the scrambled and interleaved DFT pre-coded small message data to a sub-tile.

13. The method of claim 11, wherein the small message data comprises forward or reverse channel data.

14. The method of claim 11, wherein the small message data comprises R-ACKCH data, and the wireless communication system comprises an OFDMA system.

15. A method for reducing interference in a wireless communication system, the method comprising:
    defining a hopping sequence for small messages, wherein the hopping sequence is different from hopping sequences used in neighboring sectors to reduce the possibility of collisions;
    inputting small message data;
    DFT pre-coding the small message data;
    interleaving the DFT pre-coded small message data;
    generating a plurality of tiles for transmission, each tile including an upper half-tile and a lower half-tile, the upper half-tile comprising sub-carriers with frequencies that are higher than the frequencies of the sub-carriers of the lower half-tile;
    based on the hopping sequence, inserting the interleaved small message data into only the upper half-tile of a first tile and inserting pilot information into only the lower half-tile of the first tile; and
    based on the hopping sequence, inserting the interleaved small message data into only the lower half-tile of a second tile and inserting pilot information into only the upper half-tile of the second tile.

16. The method of claim 15, further comprising mapping the interleaved DFT pre-coded small message data to a sub-tile.

17. The method of claim 15, wherein the small message data comprises forward or reverse channel data.

18. The method of claim 15, wherein the small message data comprises R-ACKCH data, and the wireless communication system comprises an OFDMA system.

19. An apparatus for reducing interference in a wireless communication system, the apparatus comprising:
    a DFT pre-coder unit configured to spread a plurality of input small message bits;
    a scrambler unit coupled to an output of the DFT pre-coder unit and configured to scramble the spread small message bits;
    a mapper unit coupled to an output of the scrambler unit and configured to map the scrambled small message bits to a first sub-tile and a second sub-tile; and
    a processing unit coupled to an output of the mapper unit and configured to:

define a hopping sequence for small messages, wherein the hopping sequence is different from hopping sequences used in neighboring sectors to reduce the possibility of collisions;

generate a plurality of tiles for transmission, each tile including an upper half-tile and a lower half-tile, each half-tile comprising a plurality of sub-tiles, the upper half-tile comprising sub-carriers with frequencies that are higher than the frequencies of the sub-carriers of the lower half-tile;

based on the hopping sequence, insert the first sub-tile into only the upper half-tile of a first tile and insert pilot information into only the lower half-tile of the first tile; and based on the hopping sequence, insert the second sub-tile into only the lower half-tile of a second tile and insert pilot information into only the upper half-tile of the second tile.

20. The apparatus of claim 19, wherein the plurality of small message bits comprises a plurality of ACK bits for a R-ACKCH.

21. An apparatus for reducing interference in a wireless communication system, the apparatus comprising:

a DFT pre-coder unit configured to spread a plurality of input small message bits;

an interleaver unit coupled to an output of the DFT pre-coder unit and configured to interleave the spread small message bits;

a mapper unit coupled to an output of the interleaver unit and configured to map the interleaved small message bits to a first sub-tile and a second sub-tile; and a processing unit coupled to an output of the mapper unit and configured to:

define a hopping sequence for small messages, wherein the hopping sequence is different from hopping sequences used in neighboring sectors to reduce the possibility of collisions;

generate a plurality of tiles for transmission, each tile including an upper half-tile and a lower half-tile, each half-tile comprising a plurality of sub-tiles, the upper half-tile comprising sub-carriers with frequencies that are higher than the frequencies of the sub-carriers of the lower half-tile;

based on the hopping sequence, insert the first sub-tile into only the upper half-tile of a first tile and insert pilot information into only the lower half-tile of the first tile; and based on the hopping sequence, insert the second sub-tile into only the lower half-tile of a second tile and insert pilot information into only the upper half-tile of the second tile.

22. An apparatus for reducing interference in a wireless communication system, the apparatus comprising:

a DFT pre-coder unit configured to spread a plurality of input small message bits;

a scrambler unit coupled to an output of the DFT pre-coder unit and configured to scramble the spread small message bits;

an interleaver unit coupled to an output of the scrambler unit and configured to interleave the scrambled small message bits;

a mapper unit coupled to an output of the interleaver unit and configured to map the interleaved small message bits to a first sub-tile and a second sub-tile; and a processing unit coupled to an output of the mapper unit and configured to:

define a hopping sequence for small messages, wherein the hopping sequence is different from hopping sequences used in neighboring sectors to reduce the possibility of collisions;

generate a plurality of tiles for transmission, each tile including an upper half-tile and a lower half-tile, each half-tile comprising a plurality of sub-tiles, the upper half-tile comprising sub-carriers with frequencies that are higher than the frequencies of the sub-carriers of the lower half-tile;

based on the hopping sequence, insert the first sub-tile into only the upper half-tile of a first tile and insert pilot information into only the lower half-tile of the first tile; and based on the hopping sequence, insert the second sub-tile into only the lower half-tile of a second tile and insert pilot information into only the upper half-tile of the second tile.

23. The apparatus of claim 22, wherein the processing unit is further configured to:

insert traffic data into the upper half of the tile, if the first sub-tile is inserted into the lower half of the tile; and insert traffic data into the lower half of the tile, if the first sub-tile is inserted into the upper half of the tile.

* * * * *